(12) United States Patent
Cheng

(10) Patent No.: US 7,050,139 B2
(45) Date of Patent: May 23, 2006

(54) METHOD OF REPAIRING LIQUID CRYSTAL DISPLAY THROUGH APPLICATION OF OPAQUE MATERIAL TO DEFECT PIXEL ELECTRODE

(75) Inventor: Ching Wen Cheng, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 13 days.

(21) Appl. No.: 10/693,506

(22) Filed: Oct. 27, 2003

(65) Prior Publication Data

US 2004/0233346 A1    Nov. 25, 2004

(30) Foreign Application Priority Data

May 22, 2003   (TW) ............................. 92113889 A

(51) Int. Cl.
 *G02F 1/1345* (2006.01)
(52) U.S. Cl. ..................... 349/152; 349/54; 349/55
(58) Field of Classification Search ............ 349/54–55, 349/192
See application file for complete search history.

(56) References Cited

U.S. PATENT DOCUMENTS

| | | | | |
|---|---|---|---|---|
| 5,267,066 A | * | 11/1993 | Nakai et al. | ................. 349/110 |
| 5,771,082 A | * | 6/1998 | Chaudet et al. | ................ 349/39 |
| 5,926,161 A | * | 7/1999 | Furuhashi et al. | .......... 345/100 |
| 6,035,526 A | * | 3/2000 | Saruta et al. | ................. 29/846 |
| 6,239,856 B1 | * | 5/2001 | Imura et al. | ................. 349/192 |

* cited by examiner

*Primary Examiner*—Andrew Schechter
*Assistant Examiner*—Phu Vu
(74) *Attorney, Agent, or Firm*—Finnegan, Henderson, Farabow, Garrett & Dunner, L.L.P.

(57) ABSTRACT

A device is used for repairing a defective area on a thin film transistor substrate of a liquid crystal display. The repairing device comprises an applicator and a tank. The tank contains an opaque material. The applicator is precisely positioned on the defective area and applies the opaque material on the defective area.

12 Claims, 4 Drawing Sheets

METHOD OF REPAIRING LIQUID CRYSTAL DISPLAY THROUGH APPLICATION OF OPAQUE MATERIAL TO DEFECT PIXEL ELECTRODE

CROSS REFERENCE TO RELATED APPLICATION

This application claims the priority benefit of Taiwan patent application serial No. 092113889, filed on May 22, 2003, and the full disclosure thereof is incorporated herein by reference.

BACKGROUND OF THE INVENTION

1. Field of the Invention

The present invention relates to a repairing device for a liquid crystal display, and more particularly, to a device for repairing the defects on a thin film transistor substrate of a liquid crystal display.

2. Description of the Related Art

With the advantages of low-power consuming, low-heat dissipation and light weight, liquid crystal displays (LCD) have been widely used in the electronic products and even have replaced the traditional CRT displays.

A liquid crystal display device typically includes a pair of substrates which are maintained in a spaced apart, and parallel relationship with one another. The space between the substrates is commonly referred to as the cell gap. Interposed between the substrates, within the cell gap, is a liquid crystal material which changes its optical characteristics in response to applied voltage signals. Taking a thin film transistor (TFT) liquid crystal display (LCD) as an example, pixel electrodes are disposed on a substrate and color filters are disposed on the other substrate for applying the predetermined signals to the liquid crystal material and for generating images on the TFT LCD. The substrates are made of high quality transparent material, such as glass, acrylic resin (PMMA) and the like.

Referring to FIG. 1, it depicts a manufacturing process of a thin film transistor liquid crystal display 10 in the prior art. The thin film transistor liquid crystal display 10 comprises a thin film transistor substrate 12 and a color filter substrate 14. The thin film transistor substrate 12 has scan lines 22 and data lines 24 perpendicular to the scan lines 22, both of which are electrically connected to the thin film transistor 23 for controlling pixel electrodes 26 for generating images. The color filter substrate 14 comprises a black matrix 42 for defining a plurality of pixel areas which are coated with red filters 44, green filters 46, and blue filters 45, respectively. Then, the thin film transistor substrate 12 and the color filter substrate 14 are aligned and combined with each other.

The image of the liquid crystal display is controlled by millions of pixel electrodes. However, if one of the millions of pixel electrodes or transistors has a defect, the defective dot or pixel will be formed on the liquid crystal display. In fact, according to the type of the defects of the pixel electrodes or transistors, the defective dots or pixels will be formed as bright dots or dark dots. Due to the visual performance, the bright dot is not acceptable for the user. Therefore, in the manufacturing process, the bright dots will be modified into the dark dots by the laser repairing device which is used for changing the electronic property of the thin film transistor or the orientation of the liquid crystal molecules. However, not all the bright dots can be modified by the laser repairing device or process, and the unmodifiable bright dots result in reducing of the quality of the liquid crystal display.

Accordingly, there exists a need for a device and method for repairing the thin film transistor substrate of the liquid crystal display and further increasing the yield of the liquid crystal display.

SUMMARY OF THE INVENTION

It is an object of the present invention to provide a device and method for repairing the pixel electrode on a thin film transistor substrate of a liquid crystal display for ensuring the modification of the defective bright dots on the liquid crystal panel into the dark dots.

In order to achieve the above object, the present invention provides a device for repairing a defective area on a thin film transistor substrate of a liquid crystal display. The repairing device comprises an applicator and a tank. The tank contains an opaque material. The applicator is precisely positioned on the defective area and applies the opaque material on the defective area.

The repairing device according to the present invention uses the applicator for applying the opaque material on the defective pixel electrode of the thin film transistor substrate. Therefore, the defective pixel electrode can be securely modified into the dark dot.

BRIEF DESCRIPTION OF THE DRAWINGS

Other objects, advantages, and novel features of the invention will become more apparent from the following detailed description when taken in conjunction with the accompanying drawing.

DESCRIPTION OF THE PREFERRED EMBODIMENT

Figure 1:
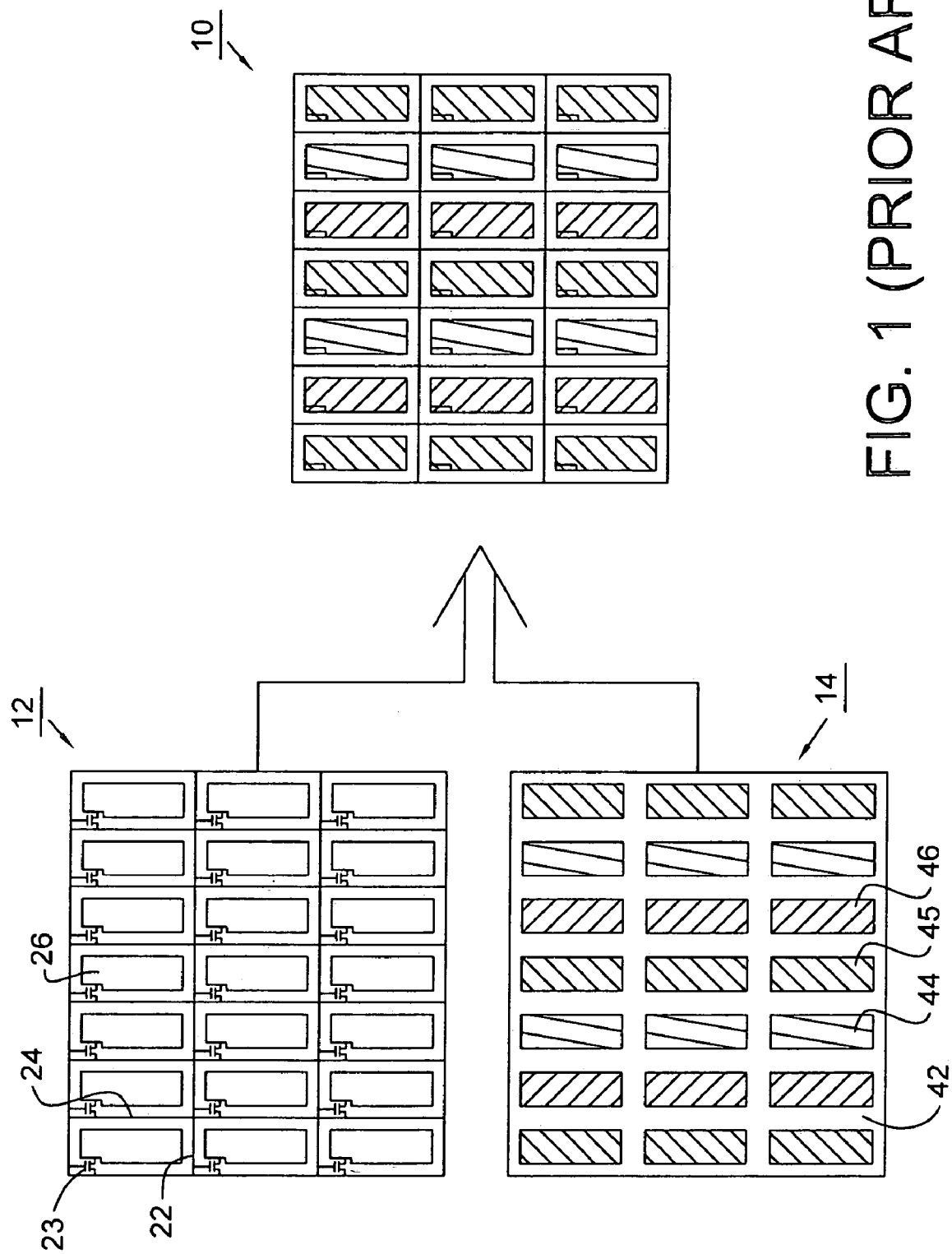
FIG. 1 is a schematic flow diagram of processes for manufacturing a liquid crystal display in the prior art.
Figure 2:
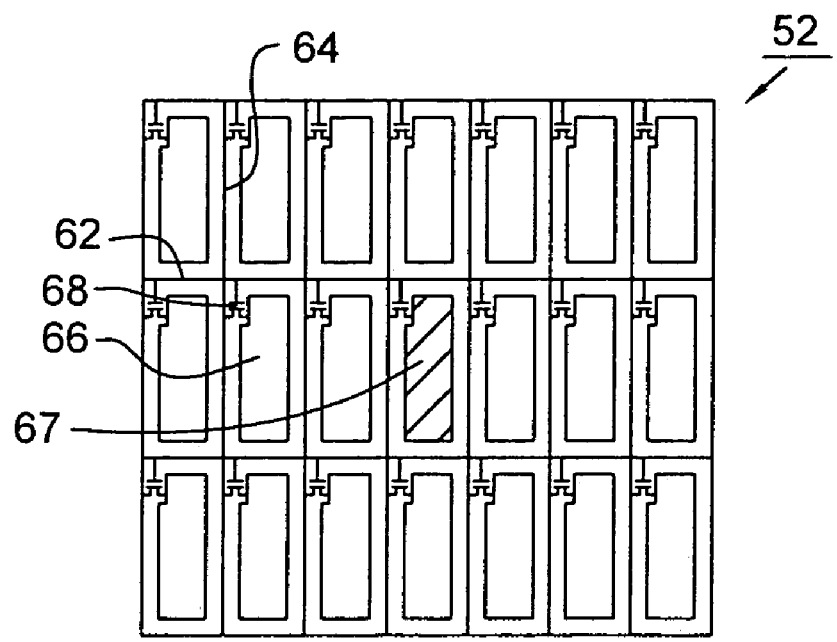
FIG. 2 is a schematic top plan view of a thin film transistor substrate of a liquid crystal display which has a defective pixel electrode.

Now referring to FIG. 2, it depicts a thin film transistor substrate 52 of a liquid crystal display. The thin film transistor substrate 52 has scan lines 62 and data lines 64 perpendicular to the scan lines 62, both of which are electrically connected to the thin film transistor 68 for controlling transparent pixel electrodes 66. After the thin film transistor substrate 52 has been manufactured, it will be inspected by an array test for defective pixel electrodes. For example, a defective pixel electrode 67 of the thin film transistor substrate 52 has been inspected out and shown as the shadow area in FIG. 2.

Figure 3:
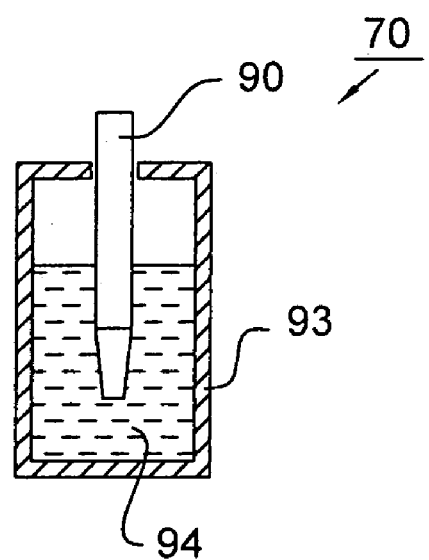
FIG. 3 is a schematic cross-sectional view of a needle and a tank, which contains an opaque material, of a repairing device according to the present invention.
Figure 4:
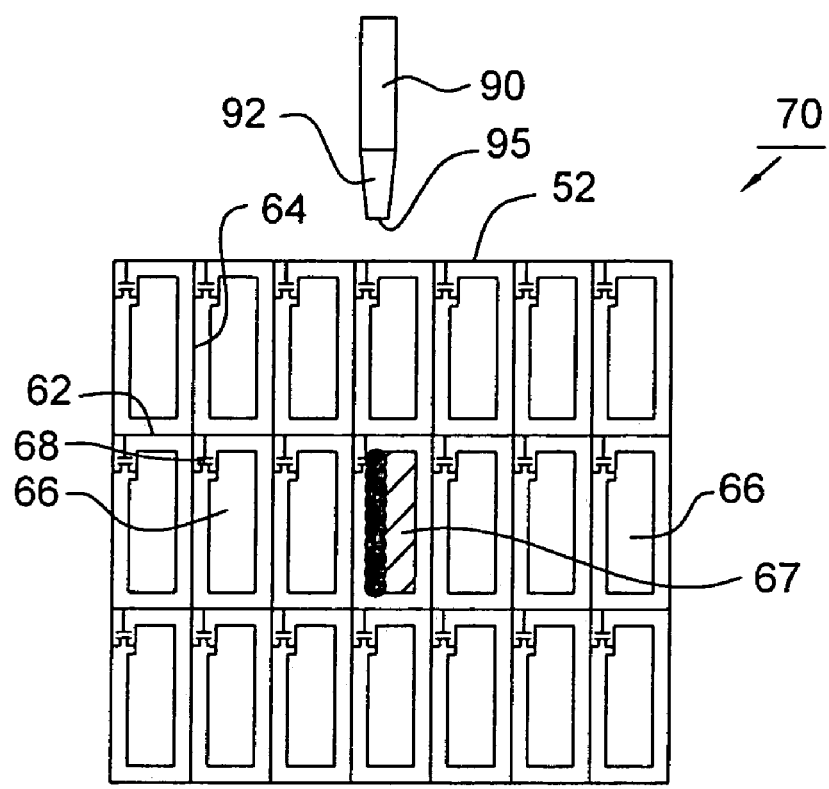
FIG. 4 is a schematic view for showing that the needle of the repairing device according to the present invention is used to apply the opaque material.

Referring to FIGS. 3 and 4, the defective thin film transistor substrate 52 is placed on a repairing device 70 according to the present invention. As shown in FIG. 3, the repairing device 70 comprises an applicator, such as a needle 90, and a tank 93 for containing an opaque material 94. The needle 90 is immersed or drowned in the opaque material 94 of the tank 93 such that the opaque material 94 is attached to the surface of the needle 90 by the surface tension. Now referring to FIG. 4, the needle 90 is positioned on the defective pixel electrode 67 and further is in contact with the defective pixel electrode 67 so as to apply the opaque material 94 to the defective pixel electrode 67. The needle 90 has a tip portion 92 which is frusta conical in shape and a top 95 which is substantially flat. The top 95 is in contact with the defective pixel electrode 67 such that a dot 96 is formed on the defective pixel electrode 67.

Figure 5:
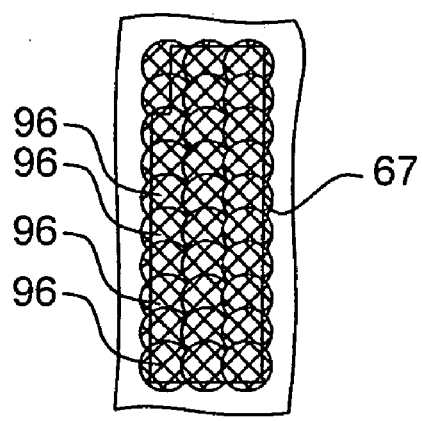
FIG. 5 is a schematic enlarged view of the defective pixel electrode of the thin film transistor substrate covered with the opaque material.

Now referring to FIG. 5, the diameter of the top 95 of the needle 90 is smaller than the width as well as the length of the defective pixel electrode 67. Each time the needle 90 touches the defective pixel electrode 67 and forms a dot 96. The needle 90 is repeatedly immersed into the opaque material 94 of the tank 93 and repeatedly touches the defective pixel electrode 67 such that the entire defective pixel electrode 67 is covered with the opaque material 94. The repairing device 70 according to the present invention is provided with positioning and moving apparatus (not shown) for precisely positioning the needle 90 on the defective pixel electrode 67 and moving the needle 90 each time for a predetermined distance, which is less than the diameter of the top 95 or the dot 96, so as to cover the entire defective pixel electrode 67 with the opaque material 94.

Figure 6:
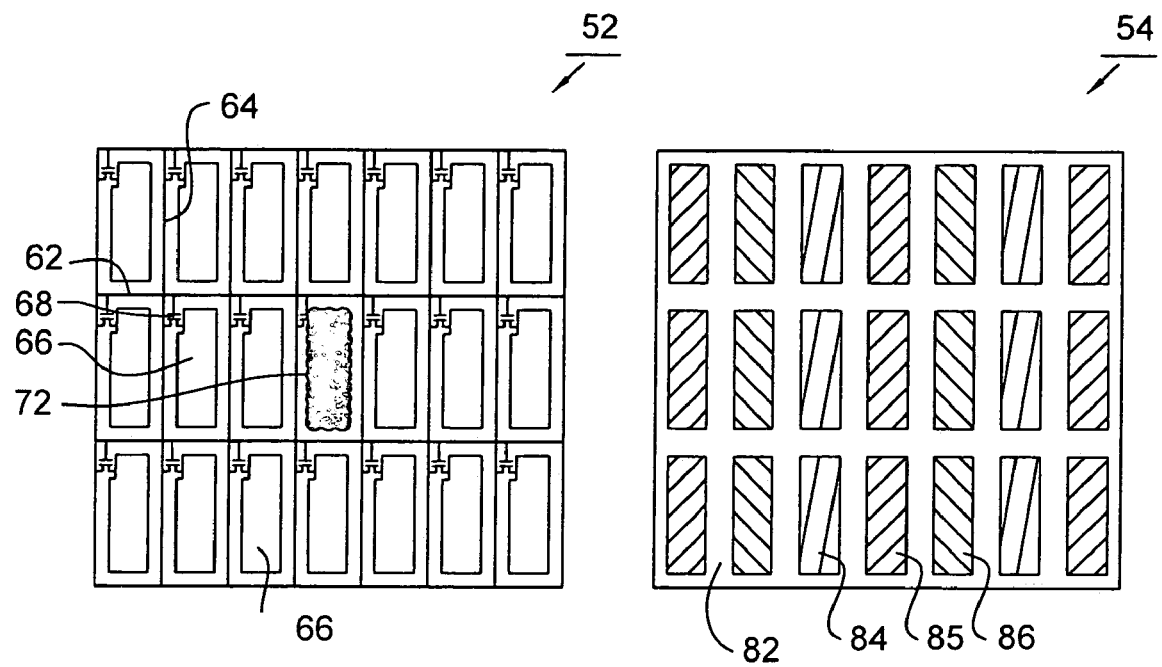
FIG. 6 is a schematic diagram showing the alignment process of the thin film transistor substrate and a color filter substrate.
Figure 7:
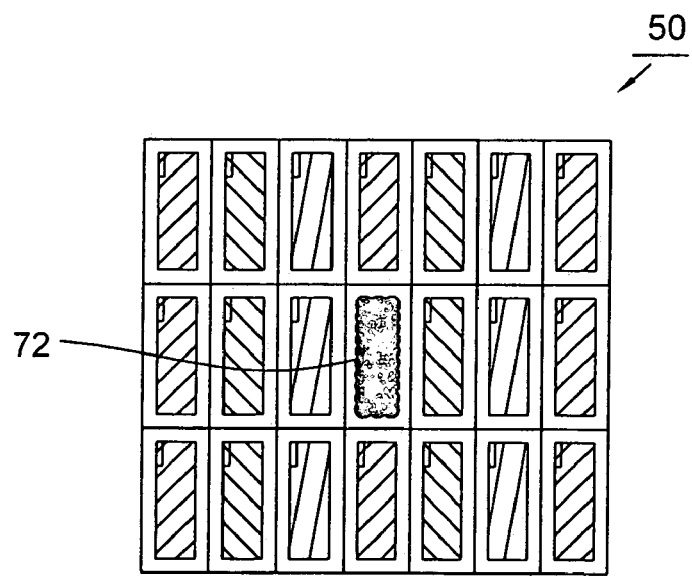
FIG. 7 is a schematic top plan view of a liquid crystal display with a dark dot.

Referring to FIG. 6, the thin film transistor substrate 52 is aligned and then combined with a color filter substrate 54 to form a liquid crystal display 50, which is shown in FIG. 7. The color filter substrate 54 comprises a black matrix 82 for defining a plurality of pixel areas. The pixel areas are coated with red filters 84, green filters 86, and blue filters 85, respectively. A transparent common electrode layer (not shown) is coated on the color filter substrate 54. It will be apparent to those skilled in the art that polarizers (not shown) are further provided outside the thin film transistor substrate 52 and the color filter substrate 54.

As shown in FIG. 7, the liquid crystal display 50 is provided with an opaque area 72 with the opaque material 94. Light cannot be transmitted through the opaque area 72 or the defective pixel electrode 67 such that a dark dot is formed.

It will be apparent to those skilled in the art that the applicator according to the present invention is not limited to the needle 90 and other applicators with other shapes can be used to apply the opaque material. The top of the applicator can be formed in any shape, such as rectangle and square. Alternatively, the top of the applicator can be formed in the shape corresponding to that of the pixel electrode of the thin film transistor substrate or corresponding to that of the pixel area of the color filter substrate.

Furthermore, the opaque material 94 must be provided with substantially high adhesion for being attached to the pixel electrode so as to prevent the opaque material 94 from peeling off from the pixel electrode, especially after the liquid crystal display is assembled. The opaque material 94 can be a kind of light-curing material. After the opaque material 94 is applied on the defective pixel electrode 67, the opaque material 94 can be cured by light and the mask (not shown) and the shape of the applied area can be further modified. The opaque material 94 is a kind of unfading material for avoiding fading due to the long-term irradiation of the back light of the liquid crystal display and thus avoid reducing the display quality of the pixel.

As indicated in the above description, the repairing device and method according to the present invention uses a needle applicator for applying an opaque material on a defective pixel electrode on the thin film transistor substrate of the liquid crystal display. Therefore, the defective pixel electrode is securely modified to a dark dot thereby facilitating repairing and increasing the yield of the liquid crystal display.

Although the invention has been explained in relation to its preferred embodiment, it is to be understood that many other possible modifications and variations can be made without departing from the spirit and scope of the invention as hereinafter claimed.

What is claimed is:

1. A method for repairing a liquid crystal display, comprising:
    providing a thin film transistor substrate of a liquid crystal display having a defective pixel electrode;
    providing an applicator with an opaque material;
    positioning the applicator on the defective pixel electrode; and
    moving the applicator for getting in contact with the defective pixel electrode such that the opaque material is applied to be in contact with the defective pixel electrode.

2. The repairing method as claimed in claim 1, wherein providing the applicator with the opaque material further comprises:
    providing a tank containing the opaque material; and
    immersing the applicator in the opaque material of the tank.

3. The repairing method as claimed in claim 1, wherein the applicator is a needle.

4. The repairing method as claimed in claim 1, wherein the needle has a flat top for being in contact with the defective pixel electrode.

5. The repairing method as claimed in claim 1, further comprising:
    inspecting the thin film transistor substrate for the defective pixel electrode by an array test.

6. A liquid crystal display comprising:
    a thin film transistor substrate having a plurality of scan lines, a plurality of data lines, a plurality of pixel electrodes, and a plurality of thin film transistors individually electrically connected to the scan lines, the data lines, and the pixel electrodes, wherein one of the pixel electrodes is defective;
    a color filter substrate defining a plurality of pixel areas corresponding to the pixel electrodes; and
    an opaque material applied on and in contact with the defective pixel electrode of the thin film transistor substrate.

7. The liquid crystal display as claimed in claim 6, wherein the opaque material is formed by light curing.

8. The liquid crystal display as claimed in claim 6, wherein the defective pixel electrode having the opaque material applied thereon is formed as a dark dot.

9. The liquid crystal display as claimed in claim 6, wherein the opaque material is provided with high adhesion so as to prevent the opaque material from peeling off from the defective pixel electrode.

10. The liquid crystal display as claimed in claim 6, wherein the defective pixel electrode is inspected by an array test.

11. The liquid crystal display as claimed in claim 6, wherein the opaque material is applied by an external applicator.

12. The repairing method as claimed in claim 1, wherein the opaque material is applied to be in contact with the defective pixel electrode such that the defective pixel electrode is formed as a dark dot.

* * * * *